Patented June 10, 1924.

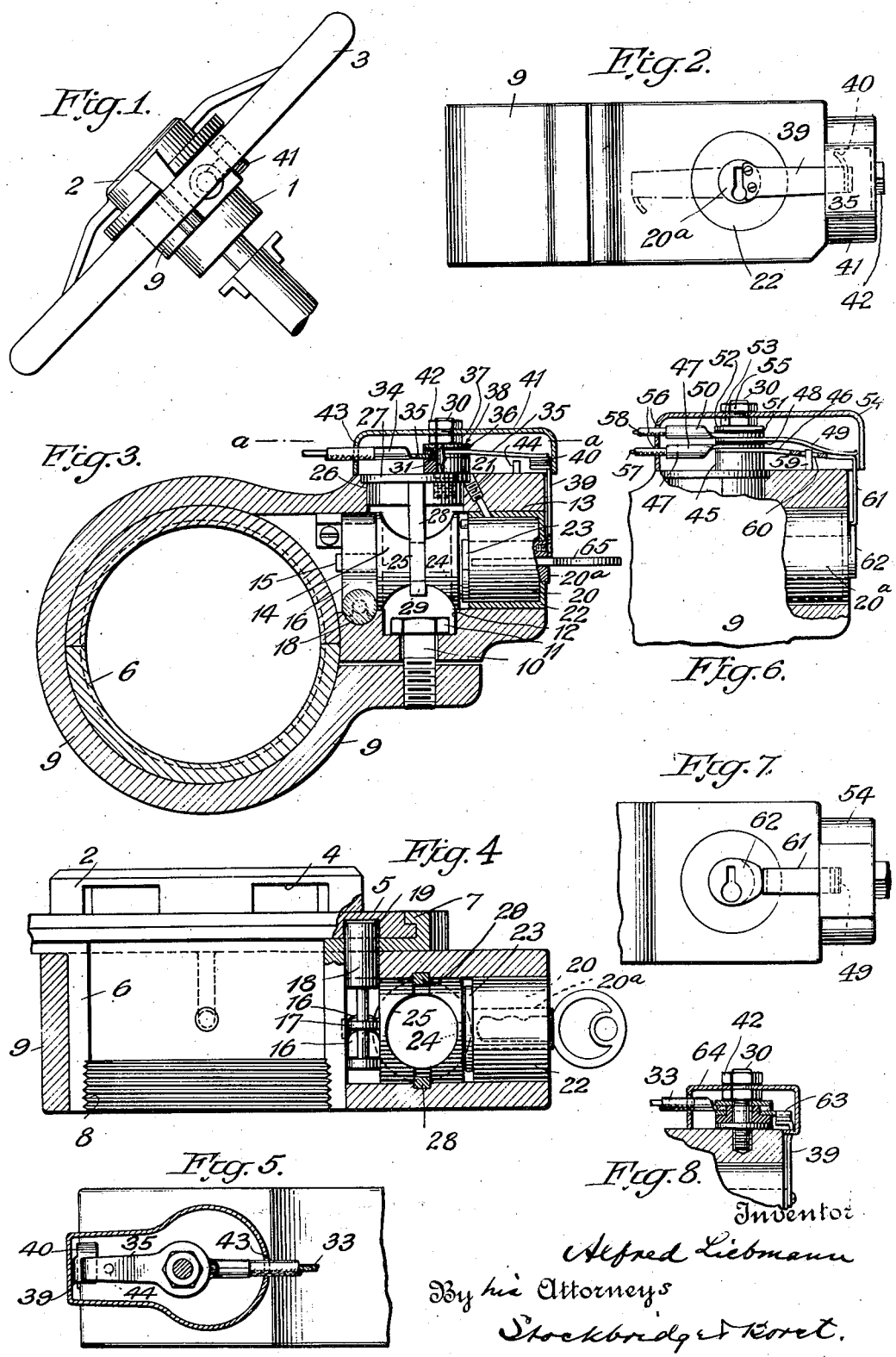

1,496,813

UNITED STATES PATENT OFFICE.

ALFRED LIEBMANN, OF NEW YORK, N. Y., ASSIGNOR TO AUTO KONTROL LOCK CORPORATION, A CORPORATION OF NEW YORK.

LOCK FOR VEHICLES.

Application filed March 25, 1922. Serial No. 546,554.

*To all whom it may concern:*

Be it known that I, ALFRED LIEBMANN, a citizen of the United States, residing at New York, in the county of New York and State of New York, have invented certain new and useful Improvements in Locks for Vehicles, of which the following is a full, clear, and exact description.

In the operation of motor vehicles which have their steering mechanism locked to prevent theft, there is a possibility that an absent-minded person might start the vehicle before he had unlocked the steering mechanism. Such a situation in which a vehicle can be operated while it is not under the complete control of the operator is fraught with danger, both to the operator and to the public.

An object of the invention is to provide an improved vehicle lock which is not open to this objection; which when in one condition, prevents operation of the steering mechanism of the vehicle and starting of the engine, and when in another condition, permits operation of the steering mechanism and starting of the engine; and which is simple, effective, compact, durable and inexpensive. Other objects and advantages will be apparent from the following description of embodiments of the invention and the novel features will be particularly pointed out in claims.

In the accompanying drawing:

Fig. 1, is a side elevation of the steering column of a motor vehicle to which my improved lock has been applied.

Fig. 2 is a side elevation of the improved lock.

Fig. 3 is a transverse section through the same.

Fig. 4 is a transverse section through the same but at right angles to the section shown in Fig. 3.

Fig. 5 is a section of the same taken substantially along the line *a—a* of Fig. 3.

Fig. 6 is a plan partially in section of a modified type of lock.

Fig. 7 is an end elevation of the same and

Fig. 8 is a fragmentary section of a further modified type of lock.

In the illustrated embodiments, the lock may be of any suitable construction and is preferably applied to the steering column of the vehicle. In the type of lock illustrated it is applied to the gear box 1 which is normally provided upon the upper end of the steering column. A cup-shaped plate 2 is fitted over the hub of the steering wheel 3, the spokes of the wheel passing through apertures 4 in the flange of the plate 2. A plate 5 is fitted against the under face of the steering wheel and abuts against and is secured to the under face of the plate 2 in a suitable manner such as by screws (not shown). A longitudinally split tubular element 6 is provided at one end with an inturned flange 7 which is adapted to rotatably embrace the periphery of the plate 5 when the sections of the tubular element are together. The tubular element is adapted to embrace the upper end of the gear box 1 and is provided with internal threads 8 which engage with the usual threads found upon the gear box by means of which the cover of the gear box is attached. The cover for the gear box is of course, discarded when this lock is applied to the gear box. A split clamping ring 9 is adapted to surround the tubular element 6 and press the sections thereof firmly together and into firm engagement with the gear box so as to prevent longitudinal movement or rotation of the split tubular element relatively to the gear box. The arms of the ring are adjustably clamped or secured together by means of a screw 10 which passes through one arm and threads into the other arm of the ring, the head 11 of the screw being countersunk in a recess 12 of the ring. The arm of the ring in which the recess 12 is provided is also provided with a cylindrical recess 13, in which a cylinder 14 is rotatably mounted. The cylinder at its inner end, is provided with a cam shaped pin 15, which is adapted to operate between leaf springs 16, anchored to the wall of the recess 13, and stress the same in different directions dependent upon the angular position of the cam pin 15. The ends of the springs 16 embrace the opposite faces of a collar 17 provided upon a locking bolt 18 which reciprocates in the ring in a direction toward and from the plane of the steering wheel. The locking bolt extends through the tubular element 6 and is adapted to enter one or more recesses 19 which are provided in the under face of the plate 5 and which are brought into alignment with the locking bolt during the rotation of the plate 5 with the steering wheel. The entrance of the locking bolt into one of the recesses 19 prevents rotation of the steering wheel relatively to the steering column. A cylinder lock 20, of any suitable construction, is disposed in and closes the outer end of the recess 13 and is secured against removal from the recess by any suitable means such as a screw 21, which passes through a portion of an arm of the ring and engages with the cylinder. A bushing 22 may, however, be disposed between the cylinder lock and the walls of the recess 13. A cam 23 is carried by the barrel 20ª of the cylinder lock and is provided with a pin 24 which projects into a recess in the abutting end of the cylinder so that when the barrel of the lock is rotated, a corresponding movement will be given to the cylinder 14. The cylinder is provided with a diametrically extending aperture 25 which is adapted to be brought into alignment with the head of the screw 10, during the rotation of the cylinder from one position to the other. The arm of the ring having the recess 13 therein is also provided with a recess 26, which intersects with the recess 13 and which is substantially in alignment with the recess 12 in which the head of the screw 10 is countersunk. A closure 27 is adapted to fit into the recess 26 and close the same, the closure having rearwardly extending arms 28 which are adapted to embrace the cylinder and normally prevent removal of the closure. The portions of the cylinder which are cut away in forming the aperture 25, provide diametrically disposed arcuate passages through which the hooked ends 29 of the arms 28 may pass, when the cylinder is in one position, so as to permit removal of the closure or to permit of its reapplication to the arm. When the cylinder is rotated into a position in which the clearance passages are not abutting the arms 28, the engagement by the hooked ends of the arms with the periphery of the cylinder will effectively lock the closure 27 in the recess 26. When the closure 27 is removed and the cylinder is rotated to bring the aperture 25 into alignment with the recess 12, access is provided through the recess 26 and the aperture 25, to the head of the screw 10, in order to permit of the insertion of the screw therethrough, or the application of a socket wrench thereto in order to tighten or remove the screw. This lock is substantially the same as disclosed in the co-pending application, Serial Number 538,430, of Ernest Siegel, and is illustrative of a type of lock to which the switch may advantageously be applied.

A bolt 30 is in threaded engagement with the closure 27 and extends perpendicularly from the outer face thereof. An insulating washer 31 is passed over the bolt 30 against the face of the closure 27 and is provided on its outer face with a boss 32. A conductor 33 is provided with a terminal connector 34 which has an eye 35 that passes over the screw 30 and surrounds the boss 32 of the insulating washer. A contact spring 35 is provided at one end with an eye which also passes over the screw and surrounds the boss 32, the contact spring lying flat against the eye of the terminal connector. An insulating washer 36 is passed over the screw 30 and abuts against the upper or outer face of the boss 32 so as to press the contact spring against the terminal connector of the conductor and insulate both from the screw. A nut 37 and a washer 38 upon the screw 30 serve to clamp the terminal connector, the contact spring and the insulating washer together and against the face of the closure 27. The contact spring 35 extends substantially to the end of the split ring 9 and is adapted to be engaged by an angular end of the arm 39 which is secured against the end face of the cylinder 20ª of the lock. As the cylinder is rotated to stress the locking bolt 18 into or out of locking condition with respect to the steering wheel, the arm 39 will be swung into or out of contact with the contact spring 35. The arm 39 is provided with a cam end 40 which serves as a preliminary cam or nose for facilitating engagement of the arm with the contact spring 35 and prevents the interlocking of the arm with the contact spring. A pan-shaped casing 41 is provided with an aperture in the bottom face thereof through which the screw 30 may extend, with the open face of the casing fitted against the face of the ring in which the closure 27 is disposed. A nut 42 upon the outer end of the screw 30 serves to clamp the casing against the ring in a position to enclose the contact spring and the conductor terminal, the casing being provided with an aperture 43 for the passage of the conductor of the terminal. A post 44 of insulating material is provided upon the ring 9 in a position to be engaged by the contact spring when the latter is released by the arm 39 so as to limit the movement of the contact spring toward the ring. The conductor 33 may be connected to a wire in a circuit controlling the starting of the engine, either in the ignition circuit or the electric starter circuit. The arm 39 being grounded to the locking device and through it to the frame of the vehicle will ground the conductor 33, whenever the arm 39 is in engagement with the contact spring, and thus render the ignition or starting circuit inoperative in starting the engine. With this arrangement the arm 39 is disposed to engage with the contact spring and ground the contact 33 whenever the cylinder is rotated to stress the locking bolt 18 towards its locking position, so that if the vehicle is left in a locked condition and an attempt is made to start the engine, the attempt will be unsuccessful and will thereby serve as an indication to the operator that he has not unlocked the steering mechanism.

In the embodiment illustrated in Figure 6, a washer 45 of insulating material is disposed over the screw 30 and is provided with a reduced boss-like axial extension on its upper face over which an eye of a contact spring 46 is disposed as well as an eye of a conductor terminal 47. An insulating washer 48 fits over the boss of the washer 45 and against the terminal 47. A second contact spring 49 has an eye portion which fits over the boss of the washer 45 and against the insulating washer 48. A second conductor terminal 50 has an eye portion fitting over the boss of the insulating washer 45 and against the contact member 49, and an insulating washer 51 fits over the boss of the washer to clamp the terminal 50 against the contact spring 49. A washer 52 and a nut 53 are passed over the screw 30 and clamp the washer 51, the terminal 50, contact spring 49, terminal 47 and contact spring 46, together and against the upper face of the insulating washer 45. With this arrangement the terminal 50 is in electrical contact with the contact spring 49, the terminal 47 is in electrical contact with the contact spring 46, and each terminal and its contact spring is insulated both from the screw 30 and from the other terminal and its contact spring. A casing 54 is secured upon the screw 30 by a nut 55 and this casing is provided with apertures 56 through which conductor wires 57 and 58 pass to the terminals 47 and 50, respectively. An insulating post 59 is carried by the ring 9 and passes through an aperture 60 in the contact spring 46 so as to be engaged by the contact spring 49 when the contact spring 46 moves toward the ring O, so that normally the spring 49 will be held away from the contact spring 46. The contact spring 46 is provided with an end portion 61 which extends along the outer face of the ring 9 into proximity with the rotating barrel 20ᵃ of the cylinder lock. The rotating barrel of the cylinder lock is provided with a cam 62 having an eccentric portion which during the rotation of the cylinder lock is adapted to engage with the arm 61 of the spring 46 and cam it into electrical contact with the spring 49. During a rotation of the cylinder lock in the opposite direction through 180° the cam 62 will release the arm 61 and permit the contact spring 46 to move away from the contact spring 49 and break the electrical contact between them. The conductors 57 and 58, preferably form part, either of the ignition circuit or of the circuit of the self starter, so that when the contact springs 46 and 49 are in engagement, the circuit between conductors 57 and 58 will be closed and the engine may be started.

At the same time if the contacts 46 and 49 are out of engagement, the starting or ignition circuit will be open and one will be unable to start the engine. The cam 62 is so disposed upon the cylinder of the cylinder lock that the circuit will be closed between contact springs 46 and 49 when the steering mechanism is unlocked and be open when the steering mechanism is locked. With this arrangement it would be impossible to start the engine when complete control of the steering mechanism is impossible.

In Figure 8 a slightly modified form of the circuit controller shown in Figures 3 and 5 is illustrated. In this embodiment the screw 30 is threaded directly into the ring 9 instead of into the closure 27 and a contact spring 63 replaces the contact spring 35. The contact spring 63 has a contact end extending at right angles to its length so as to provide the necessary resiliency within a short space. A casing 64 is secured upon the screw 30 in a manner similar to that shown in the other embodiments.

In use, the assembly is made in the manner illustrated and described. When the cylinder 14 is rotated to one limit of its movement by the key 65 the cam pin 15 will, through the spring 16, stress the locking bolt to one limit of its movement such as out of locking engagement with the plate 5. The steering mechanism is then released for operation and the arm 39 will be out of engagement with the contact spring 35 or 63, or in the form shown in Figures 6 and 7 the cam 62 will have cammed the spring 46 into electrical engagement with the spring 49. The starting of the engine is then possible. If the key 65 is rotated through 180°, the cylinder 14 will be given a similar movement and the cam 15, through springs 16, will stress the locking bolt 18 against the plate 5, so that operation of the steering mechanism would bring recess 19 into alignment with the locking bolt 18, whereupon the locking bolt would be projected into the recess to prevent further operation of the steering mechanism. During this movement of the key, the arm 39 in the embodiments shown in Figures 3 to 5, and 8, will be rotated into engagement with the contact springs 35 or 63 so as to ground the conductor 33 to the casing. It will therefore be impossible to start the engine since either the ignition or starting circuit is grounded. There will, therefore, be no danger of one starting the engine when the vehicle is uncontrollable. In the embodiments shown in Figures 6 and 7, during this movement the cam 62 will be carried out of engagement with the arm 61 and the latter will then move towards the ring 9 and away from the contact spring 49, the following movement of the spring 49 being prevented by the insulating stop 59. The circuit between the conductors 57 and 58 will, therefore, be open and since these conductors are included in series either with the ignition or self-starting circuit one will be unable to start the engine while the steering mechanism is uncontrollable. These locks may be employed without the switch attachment, in which case the aperture in which the screw 30 is threaded will be utilized for the insertion of an eye bolt when the cover 27 is to be removed, so as to enable force to be applied to the closure. If at any time it is desired to apply the switch device, it can very readily be accomplished without material changes in the construction, it being merely necessary to attach the switch device by means of a screw 30 and by applying either the contact arm 39 or the cam 62.

It will thus be seen that with the combined switch and lock it will be impossible for a person to put the vehicle into operation without first releasing the steering mechanism.

It will be obvious that various changes in the details and arrangements of the parts in the embodiments herein described and illustrated, for the purpose of explaining the nature of the invention may be made by those skilled in the art within the principle and scope of the invention.

I claim:

1. In a lock for motor vehicles having a steering column, a steering member operable through the column, and a circuit which controls the starting of the engine, a locking device carried by the steering column and operable to a condition in which it prevents movement of the member relative to the column, said device including a rotating operating element, a member mounted on said element, and a switch device for said circuit adapted to be engaged and operated by said last named member to prevent starting of the engine when the steering member is locked against operation.

2. In a lock for motor vehicles having a steering column, a steering member operable through the column, and a circuit which controls the starting of the engine, a locking device carried by the steering column and operable to a condition in which it prevents movement of the member relative to the column, said device including a cylinder lock having a rotating cylinder, a switch device carried by the lock and controlling said circuit, a member carried by the rotating cylinder and adapted to operate the switch device to prevent starting of the engine when the locking device is in locked condition, and permit starting when the locking device is in unlocked condition.

3. In a lock for motor vehicles having a steering column, a steering member operable through the column and a circuit which controls the starting of the engine, a locking device carried by the column and adapted to prevent or permit operation of the steering member, said device including a rotary control member, a stud carried upon the exterior of said device, circuit controlling means mounted on said stud, and means carried by the rotary control member cooperating with said other means for controlling the said circuit whereby starting of the engine will be prevented when the steering member is locked and permitted when it is unlocked.

4. The vehicle lock substantially as set forth in claim 3, and a protective shell mounted on said stud and abutting against the locking device to form therewith an enclosing protective housing for said circuit controlling means.

In witness whereof, I hereunto subscribe my signature.

ALFRED LIEBMANN.